US012658380B2

(12) United States Patent
Bülow et al.

(10) Patent No.: US 12,658,380 B2
(45) Date of Patent: Jun. 16, 2026

(54) HANDHELD POWER TOOL

(71) Applicant: HUSQVARNA AB, Huskvarna (SE)

(72) Inventors: Per-Anders Bülow, Jönköping (SE); Stefan Kullberg, Jönköping (SE); Richard Hall, Taberg (SE); Lars Malmqvist, Forserum (SE)

(73) Assignee: HUSQVARNA AB, Huskvarna (SE)

(*) Notice: Subject to any disclaimer, the term of this patent is extended or adjusted under 35 U.S.C. 154(b) by 194 days.

(21) Appl. No.: 18/371,165

(22) Filed: Sep. 21, 2023

(65) Prior Publication Data

US 2024/0105399 A1 Mar. 28, 2024

(30) Foreign Application Priority Data

Sep. 23, 2022 (SE) .................................. 2251097-8

(51) Int. Cl.
*H01H 3/20* (2006.01)
*B25F 5/02* (2006.01)

(52) U.S. Cl.
CPC ................ *H01H 3/20* (2013.01); *B25F 5/02* (2013.01)

(58) Field of Classification Search
CPC ........... H01H 3/20; H01H 9/06; H01H 13/08; H01H 9/20; H01H 2231/048; H01H 23/164; H01H 9/28; H01H 9/282; H01H 13/14; H01H 13/186; H01H 13/28; H01H 13/52; H01H 13/68; H01H 15/005; H01H 15/06;

(Continued)

(56) References Cited

U.S. PATENT DOCUMENTS 3,629,534 A * 12/1971 Reviel .................... H01H 9/061 200/290
3,886,340 A * 5/1975 Bittel .................... H01H 9/061 200/522

(Continued)

FOREIGN PATENT DOCUMENTS

CN 106105802 A 11/2016
DE 2839002 A1 3/1980

(Continued)

OTHER PUBLICATIONS

Swedish Office Action and Search Report for Swedish Application No. 2251097-8, Mailed on Feb. 22, 2023.

*Primary Examiner* — Ahmed M Saeed
(74) *Attorney, Agent, or Firm* — Burr & Forman

(57) ABSTRACT

A handheld power tool (1) is disclosed comprising a handle (20) and a trigger element (30) extending along a curved portion of the handle (20) and being movably arranged relative to the handle (20). The power tool (1) further comprises a spring assembly (8) configured to bias the trigger element (30) towards an unactuated position relative to the handle (20) and a switch (10) configured to switch from a first state to a second state when the trigger element (30) is moved from the unactuated position. The spring assembly (8) comprises a follower (9) and a spring member (13) configured to bias the follower (9) in a first direction (d1) against a sliding surface (18) of one of the handle (20) and the trigger element (30) to bias the trigger element (30) towards the unactuated position. The follower (9) is slidably arranged relative to the sliding surface (18) along a second direction (d2) being perpendicular to the first direction (d1).

16 Claims, 6 Drawing Sheets

(58) Field of Classification Search
CPC ............. H01H 15/18; H01H 2009/065; H01H 2009/066; H01H 2009/068; H01H 2021/225; H01H 21/10; H01H 21/22; H01H 21/245; H01H 2223/003; H01H 23/04; H01H 23/20; H01H 2300/01; H01H 2300/024; H01H 3/60; H01H 5/045; H01H 5/06; H01H 5/08; H01H 9/061; H01H 9/063; H01H 9/26
See application file for complete search history.

(56) References Cited

U.S. PATENT DOCUMENTS

| | | | |
|---|---|---|---|
| 5,867,910 A | 2/1999 | Stegall et al. | |
| 6,018,939 A | 2/2000 | Nagashima | |
| 6,178,642 B1 | 1/2001 | Schaer | |
| 6,446,421 B1 | 9/2002 | Kramer et al. | |
| 8,511,399 B2 * | 8/2013 | Kunz | H01H 3/20 173/171 |
| 9,877,435 B2 | 1/2018 | Li et al. | |
| 10,569,408 B2 | 2/2020 | Shimizu | |
| 2005/0230235 A1 | 10/2005 | Park | |
| 2017/0326721 A1 | 11/2017 | Simizu | |

FOREIGN PATENT DOCUMENTS

| | | |
|---|---|---|
| DE | 3531059 A1 | 3/1987 |
| EP | 1808274 A1 | 7/2007 |
| FR | 2558567 A1 | 7/1985 |
| GB | 1219045 A1 | 1/1971 |
| WO | 2012097621 A1 | 7/2012 |
| WO | 2022255920 A1 | 12/2022 |

* cited by examiner

HANDHELD POWER TOOL

TECHNICAL FIELD

The present disclosure relates to a handheld power tool comprising a trigger element and a switch configured to switch from a first state to a second state when the trigger element is moved from an unactuated position.

BACKGROUND

A handheld power tool is a tool intended to be supported by one or two hands of a user during operation. Moreover, a handheld power tool comprises a tool which can be driven by a power source other than solely manual labour. The power source may for example comprise a combustion engine, an electric motor, a pneumatic motor, or the like. Today, there are many kinds of power tools available on the market. Examples are chain saws, circular saws, trimmers, hedge trimmers, string-trimmers, brush-cutters, multi-tools, and the like. Power tools are for example used in industry, in construction, in gardens, for housework tasks, and around houses for purposes of cutting, shaping, sanding, grinding, routing, polishing, and the like.

Power tools of various kind are associated with some mutual problems. One problem is safety. That is, a power tool can comprise a sharp tool and a powerful power source for powering the tool. Therefore, some power tools comprise a safety arrangement comprising a trigger element arranged at a handle and a switch connected to the trigger element, wherein the switch is configured to set the power tool in an active state or an inactive state based on whether a user is gripping the handle of the power tool.

The above-mentioned types of safety arrangements are capable of significantly increasing the safety during handling of a power tool and can be used to ensure that the power tool is properly held when operated, for example that the power tool is held by both hands of a user during operation.

However, the above-mentioned types of safety arrangements are also associated with some problems and design difficulties. As an example, a problem when designing a safety arrangement of the above-mentioned type is reliability, i.e., that the switch is switching state when the handle comprising the trigger element is gripped, as well as when the grip is released. Moreover, the components of the safety arrangement may be subjected to wear and tear, and from a safety perspective, it is an advantage if the safety arrangement functions in a reliable manner throughout the lifetime of the power tool.

Furthermore, many of these arrangements add cost and complexity to the power tool, and in general, on today's consumer market, it is an advantage if products, such as power tools, have conditions and/or characteristics suitable for being manufactured and assembled in a cost-efficient manner.

Moreover, on today's consumer market, it is an advantage if products, such as power tools, provides a quality feel during handling thereof.

Furthermore, certain power tools, such as hedge-trimmers, may be turned in various directions during operation and therefore these power tools may be provided with handles and safety arrangements that allow the user to hold the power tool in several different orientations including both horizontal and vertical orientations. For these types of power tools, the above-mentioned problems and design difficulties may be even more challenging.

SUMMARY

It is an object of the present invention to overcome, or at least alleviate, at least some of the above-mentioned problems and drawbacks.

According to a first aspect of the invention, the object is achieved by a handheld power tool comprising a tool, a power source configured to power the tool, a handle having an elongated shape and at least one curved portion, and a trigger element extending along the at least one curved portion of the handle and being movably arranged relative to the handle. The power tool further comprises a spring assembly configured to bias the trigger element towards an unactuated position relative to the handle, and a switch configured to switch from a first state to a second state when the trigger element is moved from the unactuated position. The spring assembly comprises a follower and a spring member configured to bias the follower in a first direction against a sliding surface of one of the handle and the trigger element to bias the trigger element towards the unactuated position. The follower is slidably arranged relative to the sliding surface along a second direction being perpendicular to the first direction.

Thereby, a power tool is provided in which the trigger element has conditions for being moved towards the unactuated position in a distinct, simple, and reliable manner when the trigger element is released from a position other than the unactuated position.

This is because the spring assembly comprises the spring member configured to bias the follower in the first direction and because the follower is slidably arranged relative to the sliding surface along the second direction being perpendicular to the first direction.

Moreover, due to the handle having the elongated shape and the at least one curved portion with the trigger element extending along the at least one curved portion, a power tool is provided allowing a user to operate the power tool in various different orientations by gripping different portions of the at least one curved portion of the handle, while ensuring a distinct, simple, and reliable return of the trigger element to the unactuated position when the handle is released.

Moreover, due to these features, the need for several spring members or spring assemblies for biasing the trigger element towards the unactuated position is circumvented, or at least reduced. As a result thereof, a power tool is provided having conditions for being manufactured and assembled in a simple, quick, and cost-efficient manner.

Furthermore, since need for several spring members or spring assemblies for biasing the trigger element towards the unactuated position is circumvented, or at least reduced, the trigger element has conditions for being moved towards the unactuated position in a more reliable, safe, and distinct manner when the trigger element is released from a position other than the unactuated position.

Moreover, since the follower is slidably arranged relative to the sliding surface along the second direction being perpendicular to the first direction, a more consistent biasing force can be obtained towards the unactuated position when the trigger element moved relative to the handle from the unactuated position. Thereby, a more consistent resistance force is provided for a user when the user moves the trigger element relative to the handle from the unactuated position at various positions along the at least one curved portion of the handle. In this manner, conditions are provided for an improved quality feel of the power tool during handling thereof.

In addition, due to the more consistent biasing force towards the unactuated position, the trigger element has conditions for being moved towards the unactuated position in a more reliable, consistent, and distinct manner when the trigger element is released from various positions other than the unactuated position.

Furthermore, since the follower is slidably arranged relative to the sliding surface along the second direction being perpendicular to the first direction, a reduced wear and tear of the components of the power tool can be provided upon movement of the trigger element relative to the handle in directions transversal to the first direction. In this manner, a power tool is provided having conditions for being more robust and reliable.

Additionally, since the trigger element has conditions for being moved towards the unactuated position in a distinct, simple, and reliable manner, it can be further ensured that the switch switches from the second state to the first state when the trigger element is released from a position other than the unactuated position. In this manner, a power tool is provided having conditions for improved safety.

Accordingly, a power tool is provided overcoming, or at least alleviating, at least some of the above-mentioned problems and drawbacks. As a result, the above-mentioned object is achieved.

Optionally, the trigger element is movably arranged relative to the handle from the unactuated position in directions being transversal to each of the first and second directions. Thereby, a power tool is provided allowing a user to operate the power tool in various different orientations by gripping different portions of the at least one curved portion of the handle while ensuring a distinct, simple, and reliable return of the trigger element to the unactuated position when the handle is released.

Moreover, since the follower is slidably arranged relative to the sliding surface along the second direction being perpendicular to the first direction, a more consistent biasing force can be obtained towards the unactuated position when the trigger element moved relative to the handle from the unactuated position in directions transversal to the first and second directions. Thereby, the trigger element has conditions for being returned to the unactuated position in a more reliable, consistent, and distinct manner when the trigger element is released from a position other than the unactuated position.

In addition, due to the more consistent biasing force towards the unactuated position, a more consistent resistance force is provided for a user when the user moves the trigger element relative to the handle from the unactuated position in directions transversal to the first and second directions. In this manner, conditions are provided for an improved quality feel of the power tool during handling thereof.

Optionally, the power tool comprises a guiding arrangement configured to force the trigger element to obtain a movement vector component being parallel to the first direction upon movement of the trigger element from the unactuated position. Thereby, it can be ensured that the spring member biases the trigger element towards the unactuated position in a distinct, simple, and reliable manner upon movement of the trigger element relative to the handle in various directions from the unactuated position. In this manner, it can be further ensured that the switch switches from the second state to the first state when the trigger element is released from a position other than the unactuated position. Thus, a power tool is provided having conditions for improved safety, while having conditions for an improved quality feel during handling thereof and conditions for being robust and durable.

Optionally, the guiding arrangement comprises a number of guide surfaces arranged on one of the trigger element and the handle and a number of elements arranged on the other of the trigger element and the handle, and wherein the guiding arrangement is configured to force the trigger element to obtain the movement vector component by an abutting contact between at least one element of the number of elements and at least one guide surface of the number of guide surfaces. Thereby, a simple, efficient, and reliable guiding arrangement is provided. Moreover, a power tool is provided having conditions for being manufactured and assembled in a simple, quick, and cost-efficient manner.

Optionally, the at least one guide surface is angled relative to each of the first and the second directions. Thereby, a simple, efficient, and reliable guiding arrangement is provided having conditions for ensuring that the trigger element is forced to obtain a movement vector component being parallel to the first direction upon movement of the trigger element relative to the handle in various directions from the unactuated position. Moreover, a simple, efficient, and reliable guiding arrangement is provided having conditions for ensuring that the spring member biases the trigger element towards the unactuated position in a distinct, simple, and reliable manner.

Optionally, the follower is movably arranged on the other of the handle and the trigger element along directions being parallel to the first direction. Thereby, an abutting contact between the follower and the sliding surface can be ensured during handling of the power tool. As a result, a power tool is provided having conditions for improved safety, while having conditions for an improved quality feel during handling thereof, as well as conditions for being robust and durable.

Optionally, the follower is arranged on the other of the handle and the trigger element via a snap fit assembly. Thereby, a simple, efficient, and reliable spring assembly is provided. Moreover, a power tool is provided having conditions for being manufactured and assembled in a simple, quick, and cost-efficient manner.

Optionally, the snap fit assembly comprises at least one snap fit arm. Thereby, a simple, efficient, and reliable spring assembly is provided. Moreover, a power tool is provided having conditions for being manufactured and assembled in a simple, quick, and cost-efficient manner.

Optionally, the spring member is arranged at least partially inside the follower. Thereby, a spring assembly is provided having conditions for being even more reliable. This is because the spring member is at least partially protected from dust and debris by the follower. In addition, it can be ensured that the follower is biased against a sliding surface in a consistent manner at various relative positions between the trigger element and the handle. Furthermore, power tool is provided having conditions for being manufactured and assembled in a simple, quick, and cost-efficient manner. In addition, a compact spring assembly is provided.

Optionally, the sliding surface is substantially flat. Thereby, a more consistent biasing force can be obtained towards the unactuated position when the trigger element moved relative to the handle from the unactuated position. Moreover, the trigger element has conditions for being moved towards the unactuated position in a more reliable, consistent, and distinct manner when the trigger element is released from various positions other than the unactuated position. In addition, the sliding surface and the follower may be subjected to less wear and tear during use of the power tool.

Optionally, the follower comprises an abutment surface configured to abut against the sliding surface, and wherein the abutment surface is substantially flat. Thereby, a more consistent biasing force can be obtained towards the unactuated position when the trigger element moved relative to the handle from the unactuated position. Moreover, the trigger element has conditions for being moved towards the unactuated position in a more reliable, consistent, and distinct manner when the trigger element is released from various positions other than the unactuated position. In addition, the sliding surface and the follower may be subjected to less wear and tear during use of the power tool.

Optionally, the power tool comprises one spring assembly only for biasing the trigger element towards the unactuated position. Thereby, a power tool is provided having conditions for being manufactured and assembled in a simple, quick, and cost-efficient manner. Moreover, the trigger element has conditions for being moved towards the unactuated position in a more reliable, safe, and distinct manner when the trigger element is released from a position other than the unactuated position. In addition, conditions are provided for a more consistent resistance force for a user when the user moves the trigger element relative to the handle in various directions from the unactuated position. In this manner, conditions are provided for an improved quality feel of the power tool during handling thereof.

Optionally, the handle comprises a gripping portion to be gripped by a person, and wherein the trigger element has an activation portion which protrudes from the gripping portion of the handle. Thereby, it can be further ensured that the trigger element moves from the unactuated position when the handle is gripped.

Optionally, the gripping portion of the handle is curved to at least partially enclose an area, and wherein the activation portion protrudes from a slot extending on the gripping portion of the handle and faces the area. Thereby, it can be further ensured that the trigger element moves from the unactuated position when the handle is gripped. Moreover, it can be further ensured than the trigger element does not move from the unactuated position unintentionally, for example when the power tool is placed on a support surface, or the like.

Moreover, a power tool is provided having conditions for allowing a user to grip the handle at various different gripping directions during operation of the power tool in different orientations in a simple and efficient manner.

Optionally, the power tool comprises an actuator for controlling operation of the power source, and wherein the switch is configured to set the power tool in an inactive state when the switch is in the first state, wherein the inactive state constitutes a state in which control of operation of the power source via the actuator is disabled. Thereby, a power tool is provided having conditions for improved safety. This is because it can be ensured that the switch sets the power tool in the inactive state when the handle is not gripped and consequently also that a control of operation of the power source via the actuator is disabled when the handle is not gripped.

Optionally, the power tool is a hedge-trimmer, a string-trimmer, or a brush-cutter. Thereby, a hedge-trimmer, a string-trimmer, or a brush-cutter is provided having at least some of the above-mentioned advantages.

Optionally, the handle is a front handle. Thereby, a power tool is provided having conditions for improved safety. This is because it can be ensured that the switch switches from the first state to the second state in a simple, efficient, and reliable manner when the front handle is gripped and that the switch switches from the second state to the first state in a simple, efficient, and reliable manner when grip is released.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
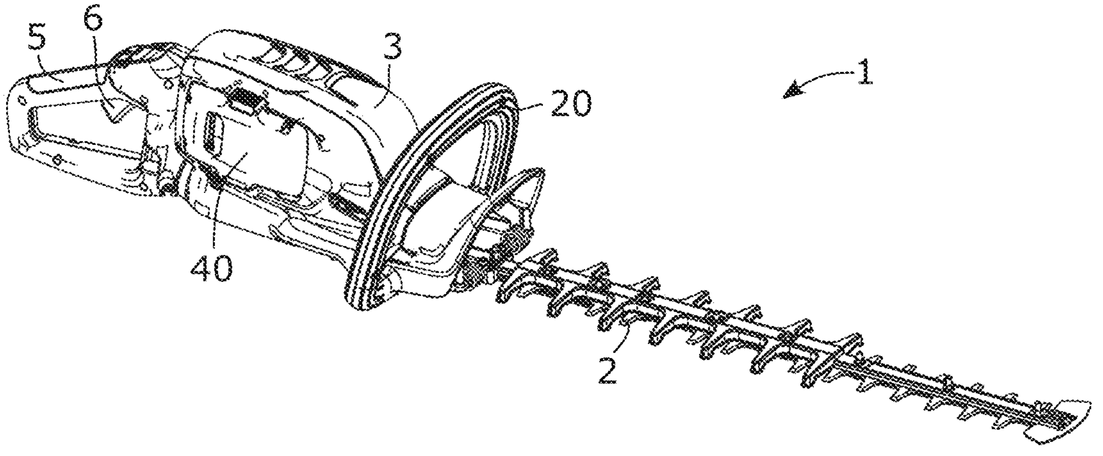
FIG. 1 illustrates a perspective view of a handheld power tool according to some embodiments.

FIG. 1 illustrates a perspective view of a handheld power tool 1 according to some embodiments. According to the illustrated embodiments, the handheld power tool 1 is a hedge trimmer. According to further embodiments, the handheld power tool 1, as referred to herein, is another type of handheld power tool, such as for example a string-trimmer, a brush-cutter, a power-cutter, a chainsaw, a circular-saw, a multi-tool, or the like.

The feature that the handheld power tool 1 is "handheld" means that the handheld power tool 1 is configured to be supported by one or two hands of a user during operation. The handheld power tool 1 according to the illustrated embodiments is configured to be supported by two hands of a user during operation, as is further explained herein. The handheld power tool 1 is in some places herein referred to as the "power tool 1" for reasons of brevity and clarity.

The power tool 1 comprises a power tool body 3, a tool 2, and a power source configured to power the tool 2. The power tool body 3 accommodates a number of components and systems of the power tool 1, such as the power source, as is further explained herein. The power tool body 3 may further comprise several further components which are not visible in FIG. 1 but that are typically provided in power tools and therefore not necessary to describe in detail here within. These components may include, but are not limited to, a gearbox, attachments for attaching the tool 2 to the power tool 1, electric wiring circuits, an electronic controller for controlling the operation of the power tool 1 and outer buttons, levers, and various controls. According to the illustrated embodiments, the tool 2 is a saw-tooth blade for cutting branches of hedges, i.e., a reciprocating cutting tool.

The power tool 1 comprises a handle 20 configured to be held by a person using the power tool 1. According to the illustrated embodiments, the handle 20 is a front handle. The power tool 1 further comprises a rear handle 5 with an actuator 6 for controlling the speed and operation of the power source of the power tool 1. The actuator 6 may also be referred to a throttle actuator, a power controlling actuator, or the like. Thus, as mentioned, according to the illustrated embodiments, the handheld power tool 1 is configured to be supported by two hands of a user during operation, i.e., one hand gripping the handle 20 and the other hand gripping the rear handle 5.

According to the illustrated embodiments, the handle 20 may be denominated a forward secondary handle and the rear handle 5 may be denominated a rear primary handle. The handle 20 according to the illustrated embodiments comprises an elongated shape and comprises at least one curved portion. In more detail, as shown in FIG. 1, the handle 20 is elongate and bent in a curved form and attached to the power tool body 3 such that it forms a continuous rounded rectangular shape that encloses an area. In operation the handle 20 may be gripped at essentially any position along its length by a person using the power tool 1. For example, a person using the power tool may grip the handle 20 at a first lateral region or at an intermediate region or at a second lateral region. In this manner, a user is allowed to operate the power tool 1 at various different orientations as is further explained herein. Some features of the shape of the handle 20 according to the illustrated embodiments is further explained with reference to FIG. 3-FIG. 6 below.

Figure 2:
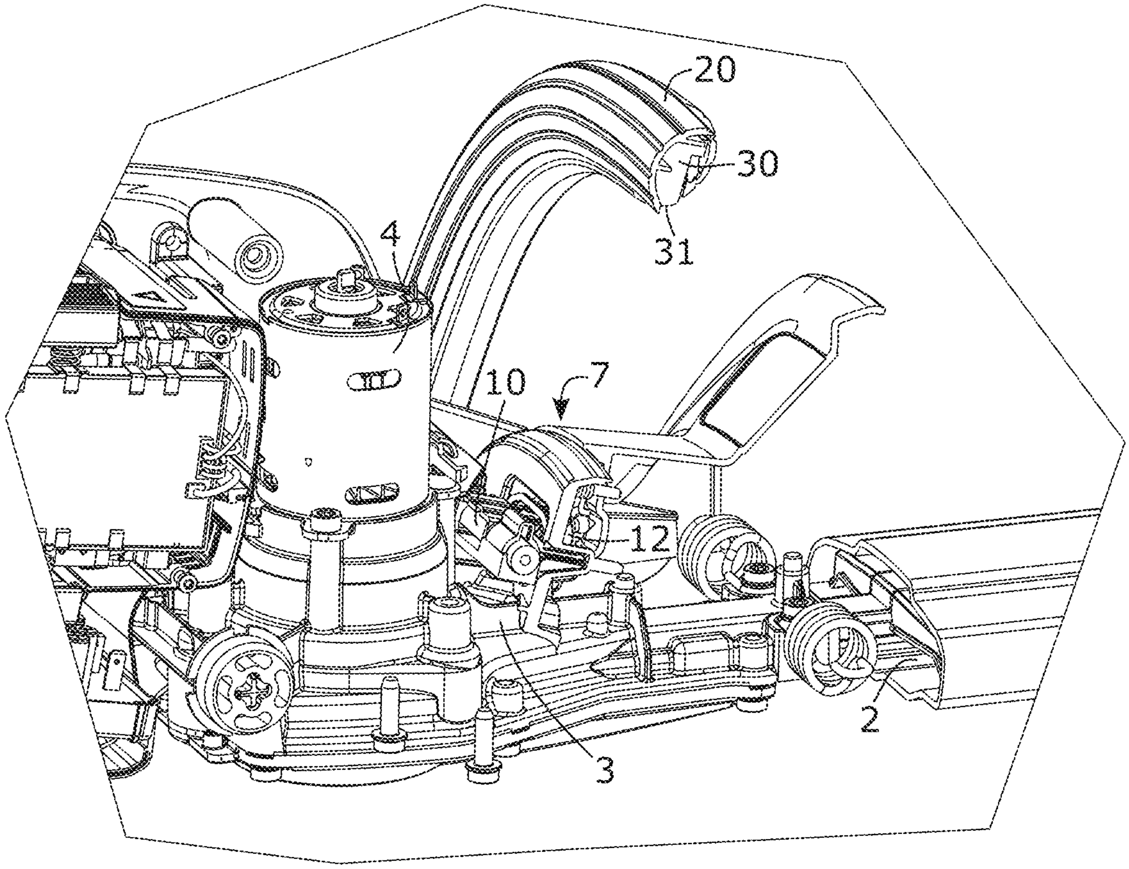
FIG. 2 illustrates a sectional view of a portion of the power tool illustrated in FIG. 1.

FIG. 2 illustrates a sectional view of a portion of the power tool 1 illustrated in FIG. 1. In FIG. 2, some components of the power tool 1 have been removed for reasons of visibility and clarity. In FIG. 2, a portion of the power tool body 3 and a portion of the tool 2 of the power tool 1 can be seen. Moreover, the power source 4 of the power tool 1 can be seen in FIG. 2. According to the illustrated embodiments, the power source 4 is an electric motor configured to be supplied with electricity from a battery. The battery 40 of the power tool 1 is indicated in FIG. 1. According to further embodiments, the power source 4 may be supplied with electricity from another type of arrangement, such as a power cord. Moreover, according to further embodiments, the power source 4, as referred to herein, may be another type of power source than an electric motor, such as a internal combustion engine, a pneumatic motor, or the like.

Moreover, in FIG. 2, a section of the handle 20 can be seen. As can be seen in FIG. 2, the handle 20 comprises a trigger element 30 extending along at least one curved portion of the handle 20 and being movably arranged relative to the handle 20. That is, the trigger element 30 is arranged movable relative to the handle 20 such that the trigger element 30 moves relative to the handle 20 when a person grips the handle 20, as is further explained herein. The trigger element 30, as referred to herein, may also be referred to as a trigger.

Furthermore, in FIG. 2, a switch 10 and a mechanism 7 of the power tool 1 can be seen. As is further explained herein, the switch 10 is operably connected to the trigger element 30 via the mechanism 7. In other words, the mechanism 7 operably connects the trigger element 30 and the switch 10. The switch 10 is configured to set the power tool 1 in an active-state or an inactive-state based on the position of the trigger element 30 relative to the handle 20. As seen in FIG. 2, according to the illustrated embodiments, the switch 10 is arranged at the power tool body 3.

Figure 3:
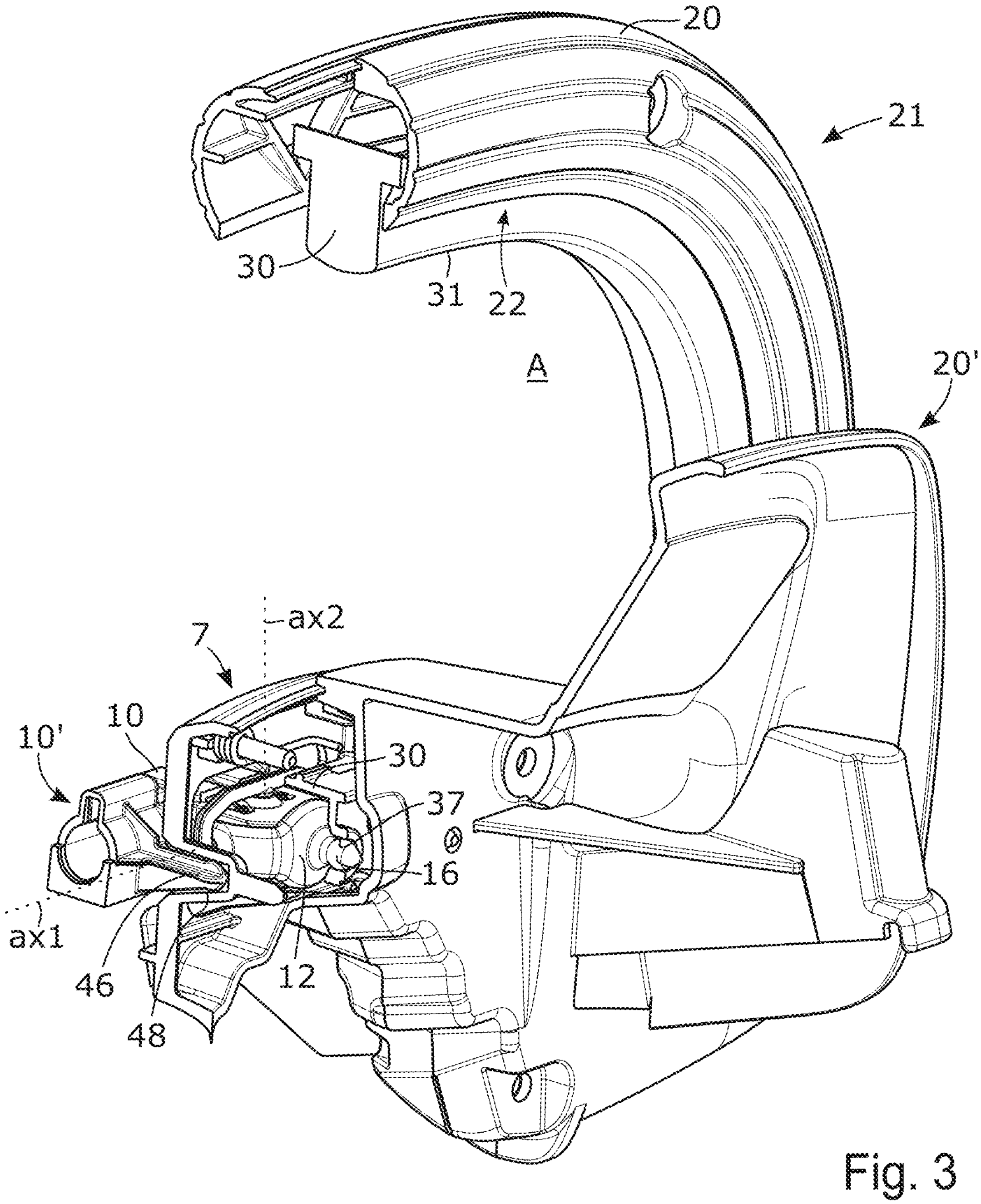
FIG. 3 illustrates a sectional view of some components of the power tool illustrated in FIG. 1 and in FIG. 2.

FIG. 3 illustrates a sectional view of some components of the power tool 1 illustrated in FIG. 1 and in FIG. 2. In FIG. 3, a handle assembly 20' and a switch assembly 10' of the power tool can be seen. The handle assembly 20' comprises the handle 20 and the trigger element 30. The switch assembly 10' comprises the switch 10. The switch assembly 10' and the handle assembly 20' are configured to be mounted to the power tool body 3 of the power tool 1 indicated in FIG. 1 and FIG. 2. The switch assembly 10' and the handle assembly 20' may be rigidly attached to the power tool body 3 of the power tool 1. Below, simultaneous reference is made to FIG. 1-FIG. 3, if not indicated otherwise.

The switch assembly 10' comprises a protrusion 46 and the handle assembly 20' comprises a recess 48. The protrusion 46 is formed as an element and is configured to protrude into the recess 48 of the handle assembly 20' when the switch assembly 10' and the handle assembly 20' are in an assembled state, as is illustrated in FIG. 3. The protrusion 46 and the recess 48 facilitates assembly and alignment of the switch assembly 10' and the handle assembly 20'. According to the illustrated embodiments, the switch assembly 10' comprises two protrusions 46 and the handle assembly 20' comprises two recesses 48. However, in FIG. 3, only one of the protrusions 46 and only one of the recesses 48 is visible. According to further embodiments, the switch assembly 10' may comprise one or more recesses and the handle assembly 20' may comprise one or more protrusions configured to protrude into a recess of the switch assembly 10' when the switch assembly 10' and the handle assembly 20' are in an assembled state.

The handle 20 comprises a gripping portion 21 to be gripped by a person. The trigger element 30 has an activation portion 31 which protrudes from the gripping portion 21 of the handle 20. The gripping portion 21 of the handle 20 is bent to at least partially enclose an area A. The activation portion 31 protrudes from a slot 22 extending on the gripping portion 21 of the handle 20 and faces the area A. The trigger element 30 is moveable arranged in the slot 22. In FIG. 3, the trigger element 30 is illustrated in an unactuated position. The unactuated position of the trigger element 30 relative to the handle 20 may also be referred to as a non-actuated position or a neutral position. As is further explained herein, the trigger element 30 is configured to assume the unactuated position when not being subjected to an external force, such as a gripping force of a hand of a user.

Moreover, in FIG. 3, a mechanism member 12 of the mechanism 7 can be seen. In FIG. 3, the mechanism member 12 is illustrated in a centred position. The mechanism member 12 of the mechanism 7 is operably connected to the trigger element 30 and is configured to move upon movement of the trigger element 30. The mechanism member 12 is configured to assume the centred position when the trigger element 30 is in the unactuated position.

According to the illustrated embodiments, the trigger element 30 comprises an aperture 37 and the mechanism member 12 comprises a knob 16 protruding into the aperture 37 of the trigger element 30. In this manner, the mechanism member 12 is operably connected to the trigger element 30. According to further embodiments, the mechanism member 12 of the mechanism 7 may be operably connected to the trigger element 30 in another manner. As an example, the mechanism member 12 may comprise comprises an aperture and the trigger element 30 may comprise a knob protruding into the aperture of the mechanism member 12 of the mechanism 7.

The switch 10 is operably connected to the trigger element 30 via the mechanism member 12 of the mechanism 7. Moreover, switch 10 is configured to switch from a first state to a second state when the mechanism member 12 is moved from the centred position. In this manner, the switch 10 is configured to switch from the first state to the second state when the trigger element 30 is moved from the unactuated position. Likewise, the switch 10 is configured to switch from the second state to the first state when the trigger element 30 is moved to the unactuated position. According to the illustrated embodiments, the switch 10 is configured to disable control of operation of the power source 4 via the actuator 6 when the switch 10 is in the first state and is configured to enable control of operation of the power source 4 via the actuator 6 when the switch 10 is in the second state, as is further explained herein.

Figure 4:
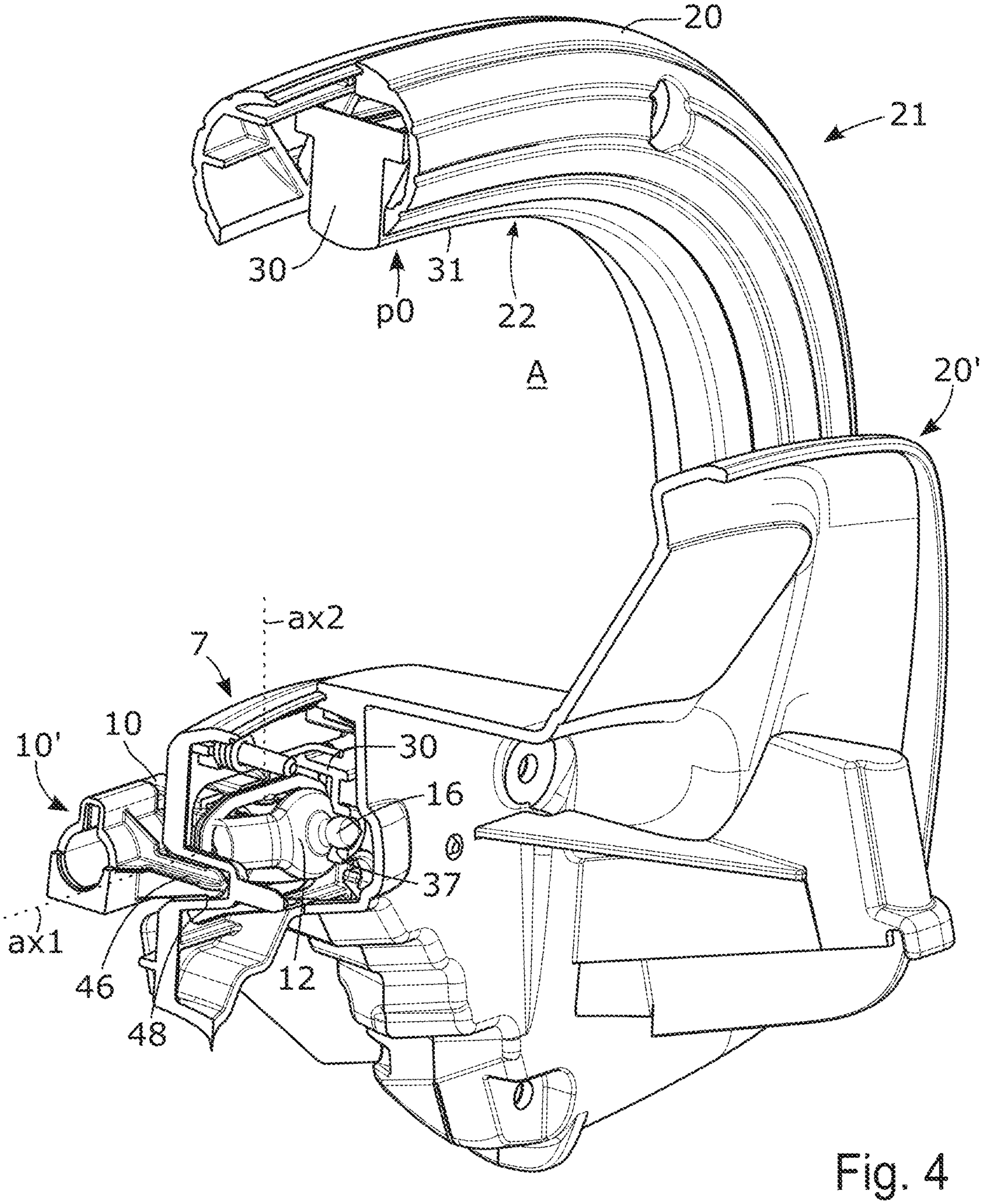
FIG. 4 illustrates the sectional view of the components of illustrated in FIG. 3 in which a trigger element has been moved to an actuated position relative to a handle of the power tool.

FIG. 4 illustrates the sectional view of the components of illustrated in FIG. 3 in which the trigger element 30 has been moved relative to the handle 20 to an actuated position. In FIG. 4, the trigger element 30 is illustrated in a position corresponding to a situation in which a user grips a centre portion p0 of the gripping portion 21 of the handle 20. The different portions p0 of the gripping portion 21 of the handle 20 and the movability of the trigger element 30 relative to the handle 20 is further explained with reference to FIG. 5 and FIG. 6 below.

As can be seen in FIG. 4, the mechanism member 12 of the mechanism 7 has been moved as a result of the movement of the trigger element 30 from the centred position. According to the illustrated embodiments, the mechanism member 12 is pivotally arranged relative to the switch assembly 10' around a first pivot axis ax1 and around a second pivot axis ax2, wherein the second pivot axis ax2 is transversal to the first pivot axis ax1. As is further explained herein, according to the illustrated embodiments, the second pivot axis ax2 is perpendicular to the first pivot axis ax1. Moreover, the second pivot axis ax2 extends through the first pivot axis ax1. According to further embodiments, the mechanism member 12 may be moveably arranged relative to the switch assembly 10' in another manner, such as around one pivot axis ax1, ax2.

The position of the mechanism member 12 of the mechanism 7 illustrated in FIG. 4 may be referred to as an actuated position, even though the mechanism member 12 of the mechanism 7 as well as the trigger element 30 of the handle 20, is movable to different actuated positions, as is further explained in the following.

Figure 5:
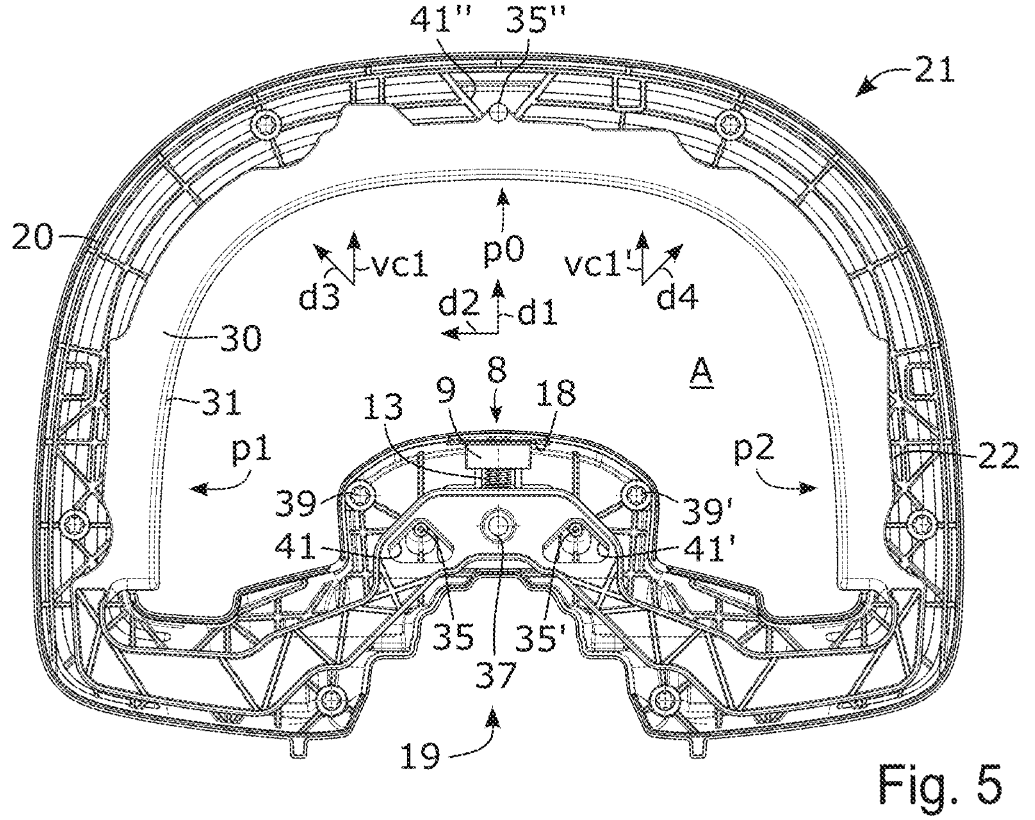
FIG. 5 illustrates a sectional view of the handle and the trigger element of the power tool according to the embodiments illustrated in FIG. 1-FIG. 4.

FIG. 5 illustrates a sectional view of the handle 20 and the trigger element 30 of the power tool 1 according to the embodiments illustrated in FIG. 1-FIG. 4. Below, simultaneous reference is made to FIG. 1-FIG. 5, if not indicated otherwise. In FIG. 5, one housing part of the handle 20 has been removed for reasons of visibility. As can be seen in FIG. 5, according to the illustrated embodiments, the trigger element 30 is a continuous integral body, i.e., is made of one piece of continuous material. The trigger element 30 may for example be made of a polymeric material. Due to these features, trigger element 30 is provided having conditions and characteristics suitable for being manufactured and assembled in a cost-efficient manner, while being durable. However, according to further embodiments, the trigger element 30 as referred to herein, may comprise an assembly of different parts.

As explained above, the trigger element 30 has an activation portion 31 which protrudes from the gripping portion 21 of the handle 20. The gripping portion 21 of the handle 20 is curved to at least partially enclose an area A. The activation portion 31 protrudes from a slot 22 extending on the gripping portion 21 of the handle 20. The activation portion 31 faces the area A and the trigger element 30 is moveable arranged in the slot 22. The slot 22 is directed inwards towards the area A that is enclosed by the handle 20.

The trigger element 30 is arranged within the handle 20. The trigger element 30 may be designed such that its shape corresponds to the shape of the handle 20. The activation portion 31 of the trigger element 30 extends through the slot 22 in the handle 20 into the area A. When a person grips the gripping portion 21 of the handle 20, the activation portion 31 of the trigger element 30 will be gripped simultaneously. The trigger element 30 is movable within the handle 20 and the trigger element 30 may thus move within the handle 20 when the activation portion 31 is gripped.

In FIG. 5, the trigger element 30 is illustrated in the unactuated position referred to above. According to the illustrated embodiments, the unactuated position may also be referred to as a centred position because the trigger element 30 is aligned with a symmetry axis of the handle 20 when in the unactuated position. As is further explained in the following, the trigger element 30 is configured to assume the unactuated position when not being subjected to an external force, such as a gripping force of a hand of a user.

That is, the power tool 1 comprises a spring assembly 8 configured to bias the trigger element 30 towards an unactuated position relative to the handle 20. In more detail, the spring assembly 8 comprises a follower 9 and a spring member 13. According to the illustrated embodiments, the follower 9 and the spring member 13 are attached to the trigger element 30. Moreover, the handle 20 comprises a sliding surface 18. According to the illustrated embodiments, the spring member 13 is configured to bias the follower 9 in a first direction d1 against the sliding surface 18 of the handle 20 to bias the trigger element 30 towards the unactuated position, as is further explained herein. The follower 9 is slidably arranged relative to the sliding surface 18 along a second direction d2 being perpendicular to the first direction d1. However, the trigger element 30 is movably arranged relative to the handle 20 from the unactuated position in directions d3, d4 being transversal to each of the first and second directions d1, d2.

According to further embodiments, the follower 9 and the spring member 13 may be attached to the handle 20 and the trigger element 30 may comprise a sliding surface. According to such embodiments, the spring member 13 may be configured to bias the follower 9 in a first direction against the sliding surface of the trigger element 30 to bias the trigger element 30 towards the unactuated position. The features, functions, and advantages of the spring assembly 8 is further explained below.

As can be seen in FIG. 5, since the gripping portion 21 of the handle 20 is bent to enclose the area A, a user may grip various portions p0, p1, p2 of the gripping portion 21 of the handle 20. Thereby, the user is allowed to operate the power tool 1 at various different orientations. In the following, the portion p0 of the gripping portion 21 of the handle 20 is referred to as a centre portion p0, the portion p1 of the gripping portion 21 of the handle 20 is referred to as a first side portion p1, and the portion p2 of the gripping portion 21 of the handle 20 is referred to as a second side portion p2. The centre portion p0 of the gripping portion 21 of the handle 20 may also be referred to as an intermediate region of the gripping portion 21 of the handle 20. The first side portion p1 of the gripping portion 21 of the handle 20 may also be referred to as a first lateral region of the gripping portion 21. The second side portion p2 of the gripping portion 21 of the handle 20 may also be referred to as a second lateral region of the gripping portion 21.

Figure 6:
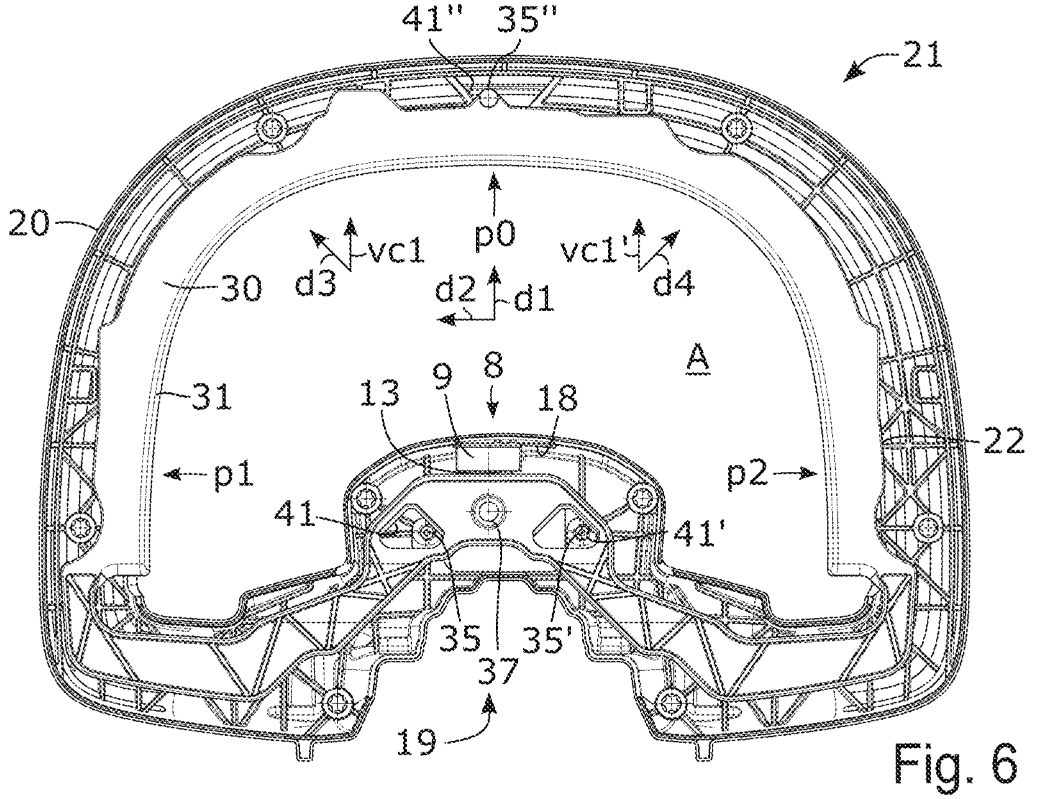
FIG. 6 illustrates the sectional view of the handle and the trigger element illustrated in FIG. 5 in which the trigger element has been moved to an actuated position.

FIG. 6 illustrates the sectional view of the handle 20 and the trigger element 30 illustrated in FIG. 5, in which the trigger element 30 has been moved to an actuated position. In FIG. 6, the trigger element 30 is illustrated in an actuated position corresponding to a situation in which a user is gripping the first side portion p1 of the gripping portion 21 of the handle 20. Below, simultaneous reference is made to FIG. 1-FIG. 6 if not indicated otherwise.

As can be seen when comparing FIG. 5 and FIG. 6, the trigger element 30 has been moved in a direction towards the first side portion p1 in FIG. 6. Due to the relative movement of the aperture 37 of the trigger element 30 and the handle 20, the trigger element 30 moves the mechanism member 12 from the centred position. As a result, the switch 10 switches from the first state to the second state. Accordingly, due to the relative movement of the trigger element 30 and the handle 20, the switch 10 is actuated, i.e., switches from the first state to the second state, when a user is gripping a portion p0, p1, p2 of the gripping portion 21 of the handle 20.

Moreover, as can be seen in FIG. 5 and FIG. 6, the power tool 1 comprises a guiding arrangement 19. The guiding arrangement 19 comprises a number of guide surfaces 41, 41', 41" arranged on the trigger element 30 and the handle 20 and a number of elements 35, 35', 35" arranged on the handle 20 and on the trigger element 30. In FIG. 5 and FIG. 6, only two guide surfaces 41, 41' of the trigger element 30 have been provided with reference signs for reasons of brevity and clarity. However, according to the illustrated embodiments, the trigger element 30 comprises four guide surfaces 41, 41'. Likewise, in FIG. 5 and FIG. 6, only one guide surface 41" of the handle 20 has been provided with a reference sign for reasons of brevity and clarity. However, according to the illustrated embodiments, the handle 20 comprises two guide surfaces 41". According to further embodiments, each of the handle 20 and the trigger element 30 may comprise another number of guide surfaces 41, 41', 41" and another number of elements 35, 35', 35". The elements 35, 35', 35" may also be referred to as a number of guide pins 35, 35', 35".

As is further explained herein, the guiding arrangement 19 is configured to force the trigger element 30 to obtain a movement vector component vc1, vc1' being parallel to the first direction d1 upon movement of the trigger element 30 from the unactuated position when the trigger element 30 is moved from the unactuated position in directions perpendicular to the first direction d1. In more detail, the guiding arrangement 19 is configured to force the trigger element 30 to obtain the movement vector component vc1, vc1' by an abutting contact between at least one element 35, 35', 35" of the number of elements 35, 35', 35" and at least one guide surface 41, 41', 41" of the number of guide surfaces 41, 41', 41". According to the illustrated embodiments, each guide surface 41, 41', 41" is angled relative to each of the first and the second directions d1, d2.

According to the illustrated embodiments, each guide surface 41, 41', 41" of the guiding arrangement 19 forms a delimiting surface of an aperture, wherein each element 35, 35', 35" of the number of elements 35, 35', 35" is protruding into one of the apertures. According to the illustrated embodiments, the handle 20 comprises one aperture and two elements 35, 35' and the trigger element 30 comprises two apertures and one element 35". Accordingly, in total, the power tool comprises three apertures and three elements 35, 35', 35". In this manner, a rigid and stabile guidance of the movement of the trigger element 30 relative to the handle 20 is provided. However, according to further embodiments, the trigger element 30 may comprise another number of the apertures and the handle 20 may comprise another number of elements, wherein each element is protruding into one of the apertures.

The components and surfaces of the guiding arrangement 19 may also be referred to as mutually mating guide surfaces 35, 35', 35", 41, 41', 41" for guiding the direction of motion of the trigger element 30 relative to the handle 20.

As mentioned, each guide surface 41, 41', 41" is angled relative to each of the first and the second directions d1, d2. As can be seen in FIG. 5 and FIG. 6, according to the illustrated embodiments, the apertures have a substantially triangular shape in which each aperture comprises two opposing guide surfaces 41, 41', 41" together forming a V-shape inside the substantially triangular shape.

Due to the abutting contact between the elements 35, 35', 35" and the angled guide surfaces 41, 41', 41", the trigger element 30 is forced to obtain a movement vector component vc1 being parallel to the first direction d1 when the first side portion p1 is being gripped. In other words, due to the abutting contact between the elements 35, 35', 35" and the angled guide surfaces 41, 41', 41", the trigger element 30 is forced in a direction upwards in FIG. 5 and FIG. 6, i.e., in a direction towards the centre portion p0 of the gripping portion 21, also when the first side portion p1 is being gripped. In FIG. 5 and FIG. 6, a movement direction d3 is indicated. The trigger element 30 moves along the movement direction d3 when the first side portion p1 is being gripped. The movement direction d3 is parallel to a number of guide surfaces 41', 41" of the guiding arrangement 19 and has a movement vector component vc1 parallel to the first direction d1 as well as a movement vector component parallel to the second direction d2.

Likewise, due to the abutting contact between the elements 35, 35', 35" and the angled guide surfaces 41, 41', 41", the trigger element 30 is forced to obtain a movement vector component vc1' being parallel to the first direction d1 when the second side portion p2 is being gripped. In other words, due to the abutting contact between the elements 35, 35', 35" and the angled guide surfaces 41, 41', 41", the trigger element 30 is forced in a direction upwards in FIG. 5 and FIG. 6, i.e., in a direction towards the centre portion p0 of the gripping portion 21, also when the second side portion p2 is being gripped. In FIG. 5 and FIG. 6, a movement direction d4 is indicated. The trigger element 30 moves along the movement direction d4 when the second side portion p2 is being gripped. The movement direction d4 is parallel to a number of guide surfaces 41 of the guiding arrangement 19 and has a movement vector component vc1' parallel to the first direction d1 as well as a movement vector component parallel to the second direction d2.

When the centre portion p0 is gripped, the abutting contact between the elements 35, 35', 35" and the guide surfaces 41, 41', 41" is released and the elements 35, 35', 35" are moved to positions within the respective aperture. Due the guiding arrangement 19, the trigger element 30 is moved within the handle 20 in a predetermined manner upon gripping different portions p0, p1, p2 of the gripping portion 21 of the handle 20. Moreover, the guiding arrangement 19 limits relative movement between the trigger element 30 and the handle 20.

Furthermore, as is understood from the above, due to the features of the guiding arrangement 19, the trigger element 30 is forced to obtain a movement vector component vc1, vc1' being parallel to the first direction d1 regardless of the movement direction from the unactuated position, i.e., regardless of which portion p0, p1, p2 of the gripping portion 21 of the handle 20 that is being gripped. As a further result, the spring member 13 of the spring assembly 8 is compressed regardless of which portion p0, p1, p2 of the gripping portion 21 of the handle 20 that is being gripped.

That is, according to the illustrated embodiments, since the spring member 13 of the spring assembly 8 is configured to bias the follower 9 in the first direction d1 against the sliding surface 18 of the handle 20, the spring member 13 is configured to bias the trigger element 30 in a direction downwards in FIG. 5 and FIG. 6 relative to the handle 20, i.e. in a direction away from the centre portion p0 of the gripping portion 21 handle 20. In other words, the spring member 13 is configured to bias the trigger element 30 in a direction opposite to the first direction d1. In this manner, the spring member 13 is compressed when the trigger element 30 moves relative to the handle 20 from the unactuated position regardless of the moving direction therefrom, which also can be seen when comparing FIG. 5 and FIG. 6.

Figure 7:
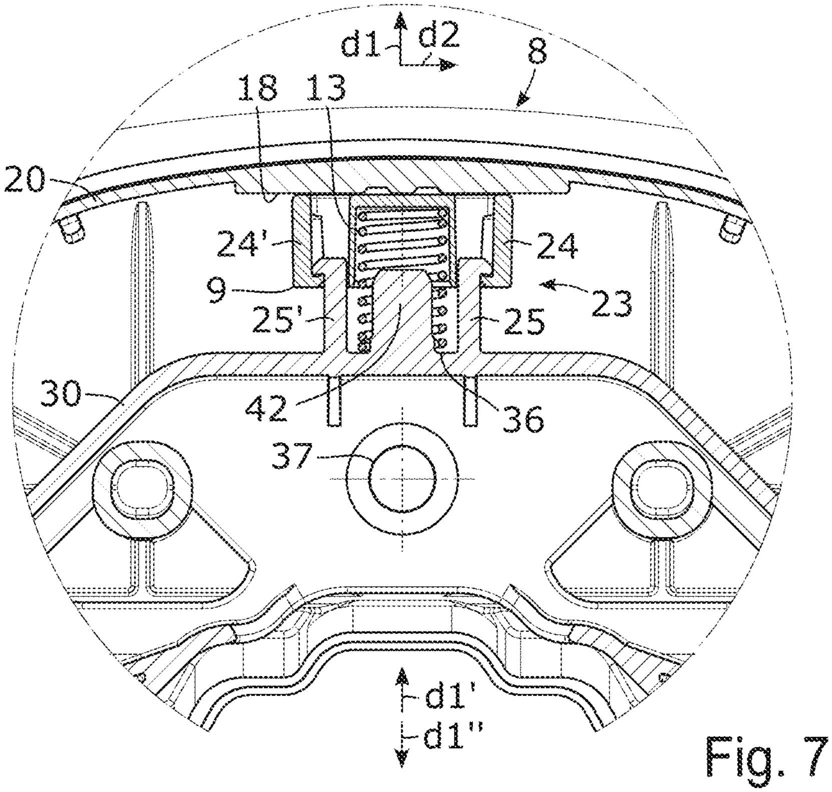
FIG. 7 illustrates an enlarged sectional view of the handle and the trigger element explained with reference to FIG. 1-FIG. 6.

FIG. 7 illustrates an enlarged sectional view of the handle 20 and the trigger element 30 explained with reference to FIG. 1-FIG. 6. In FIG. 7, the trigger element 30 is illustrated in the unactuated position relative to the handle 20, i.e., in a position corresponding to the position of the trigger element 30 relative to the handle 20 illustrated in FIG. 5.

According to the illustrated embodiments, the follower 9 is movably arranged on the trigger element 30 along directions d1', d1" being parallel to the first direction d1. Moreover, according to the illustrated embodiments, the spring member 13 is arranged on the trigger element 30 and is configured to bias the follower 9 in the first direction d1 against the sliding surface 18 of the handle 20 by applying a separating force between the follower 9 and a spring seat 36 arranged on the trigger element 30.

As indicated above, according to further embodiments of the herein described, the trigger element 30 may comprise a sliding surface 18 and the follower 9 may be movably arranged on the handle 20 along directions d1', d1" being parallel to the first direction d1. According to such embodiments, the spring member 13 may thus be arranged on the handle 20 and may be configured to bias the follower 9 in a first direction against the sliding surface of the trigger element 30 by applying a separating force between the follower 9 and a spring seat arranged on the handle 20. Since a separating force is obtained between the sliding surface and the spring seat also with such an arrangement, the trigger element 30 is forced towards the unactuated position as explained herein also with such an arrangement.

According to the illustrated embodiments, the follower 9 is movably arranged on the trigger element 30 via a snap fit assembly 23. The features functions, and advantages of the snap fit assembly is further explained with reference to FIG. 9 below.

Figure 8:
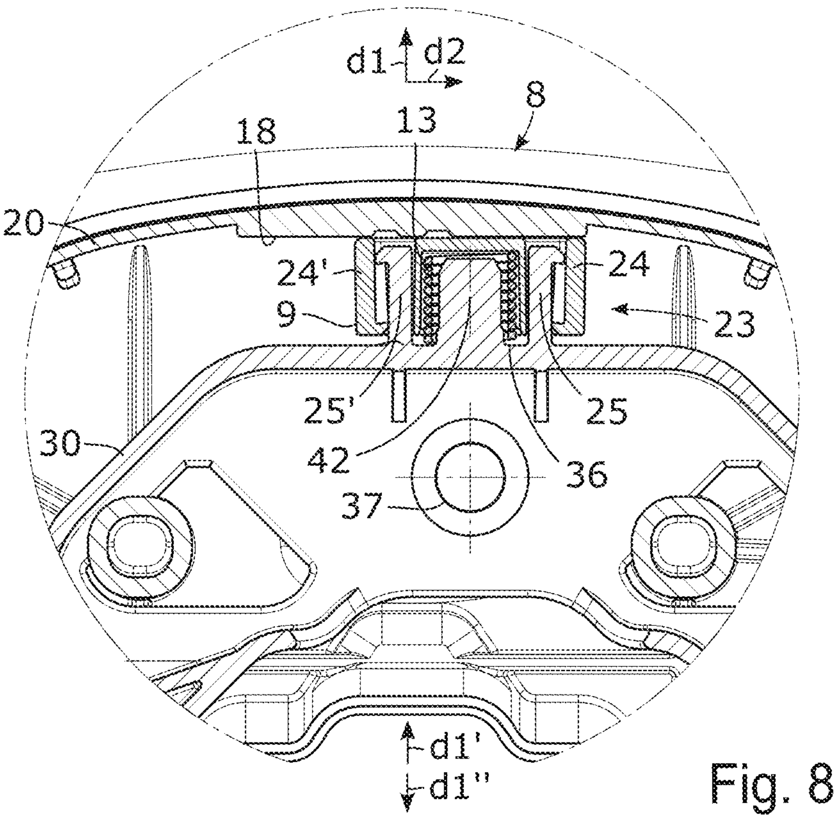
FIG. 8 illustrates the enlarged sectional view of the handle and the trigger element illustrated in FIG. 7 in which the trigger element has been moved from an unactuated position to an actuated position.

FIG. 8 illustrates the enlarged sectional view of the handle 20 and the trigger element 30 illustrated in FIG. 7 in which the trigger element 30 has been moved from the unactuated position to an actuated position. In FIG. 8, the position of the trigger element 30 relative to the handle 20 corresponds to the position of the trigger element 30 relative to the handle 20 illustrated in FIG. 6.

It is to be noted that the sectional views of the handle 20 and the trigger element 30 in FIG. 5 and FIG. 6 are illustrated as viewed in direction from the tool 2 towards the rear handle 5 of the power tool 1, see FIG. 1, whereas the enlarged sectional views of the handle 20 and the trigger element 30 in FIG. 7 and FIG. 8 are illustrated as viewed in direction from the rear handle 5 towards the tool 2 of the power tool 1. In other words, the viewing directions of FIG. 7 and FIG. 8 are opposite to FIG. 5 and FIG. 6 and the position of the trigger element 30 relative to the handle 20 in FIG. 8 corresponds to the position of the trigger element 30 relative to the handle 20 illustrated in FIG. 6.

As can be seen in FIG. 8, the spring member 13 of the spring assembly 8 is compressed upon movement of the trigger element 30 from the unactuated position relative to the handle 20. Moreover, upon the movement of the trigger element 30 from the unactuated position illustrated in FIG. 7 to the actuated position illustrated in FIG. 8, the follower 9 slides against the sliding surface 18 along the second direction d2 indicated in FIG. 7 and FIG. 8.

The following is explained with simultaneous reference to FIG. 1-FIG. 8. As understood from the above, the trigger element 30 may assume the actuated position illustrated in FIG. 8 when a user grips the first side portion p1 of the handle 20 indicated in FIG. 5 and FIG. 6. When the grip is released, the biasing force of the spring assembly 8 returns the trigger element 30 from the actuated position illustrated in FIG. 6 and FIG. 8 to the unactuated position illustrated in FIG. 5 and FIG. 7.

Due to these features, a power tool 1 is provided in which the trigger element 30 has conditions for being moved towards the unactuated position in a distinct, simple, and reliable manner when the trigger element 30 is released from a position other than the unactuated position. This is because the spring assembly 8 comprises the spring member 13 configured to bias the follower 9 in the first direction d1 and because the follower 9 is slidably arranged relative to the sliding surface 18 along the second direction d2 being perpendicular to the first direction d1.

Furthermore, as can be seen in FIG. 5-FIG. 8, the power tool 1 according to the illustrated embodiments comprises one spring assembly 8 only for biasing the trigger element 30 towards the unactuated position. As a result thereof, a power tool 1 is provided having conditions for being manufactured and assembled in a simple, quick, and cost-efficient manner. Furthermore, the trigger element 30 can be moved towards the unactuated position in a more reliable, safe, and distinct manner when the trigger element 30 is released from a position other than the unactuated position.

Moreover, since the follower 9 is slidably arranged relative to the sliding surface 18 along the second direction d2 being perpendicular to the first direction d1, a more consistent biasing force can be obtained towards the unactuated position when the trigger element 30 moved relative to the handle 20 from the unactuated position. Thereby, a more consistent resistance force is provided for a user when the user moves the trigger element 30 relative to the handle 20 from the unactuated position at various positions along the at the handle 20. In this manner, conditions are provided for an improved quality feel with a better feel and comfort when gripping the handle 20 of the power tool 1.

In addition, due to the more consistent biasing force towards the unactuated position, the trigger element 30 has conditions for being moved towards the unactuated position in a more reliable, consistent, and distinct manner when the trigger element 30 is released from various positions other than the unactuated position.

Furthermore, since the follower 9 is slidably arranged relative to the sliding surface 18 along the second direction d2 being perpendicular to the first direction d1, a reduced wear and tear of the components of the power tool 1 can be provided upon movement of the trigger element 30 relative to the handle 20 in directions transversal to the first direction d1. In this manner, a power tool 1 is provided having conditions for being more robust and reliable.

Additionally, since the trigger element 30 has conditions for being moved towards the unactuated position in a distinct, simple, and reliable manner, it can be further ensured that the switch 10 switches from the second state to the first state when the trigger element 30 is released from a position other than the unactuated position. In this manner, a power tool 1 is provided having conditions for improved safety.

Figure 9:
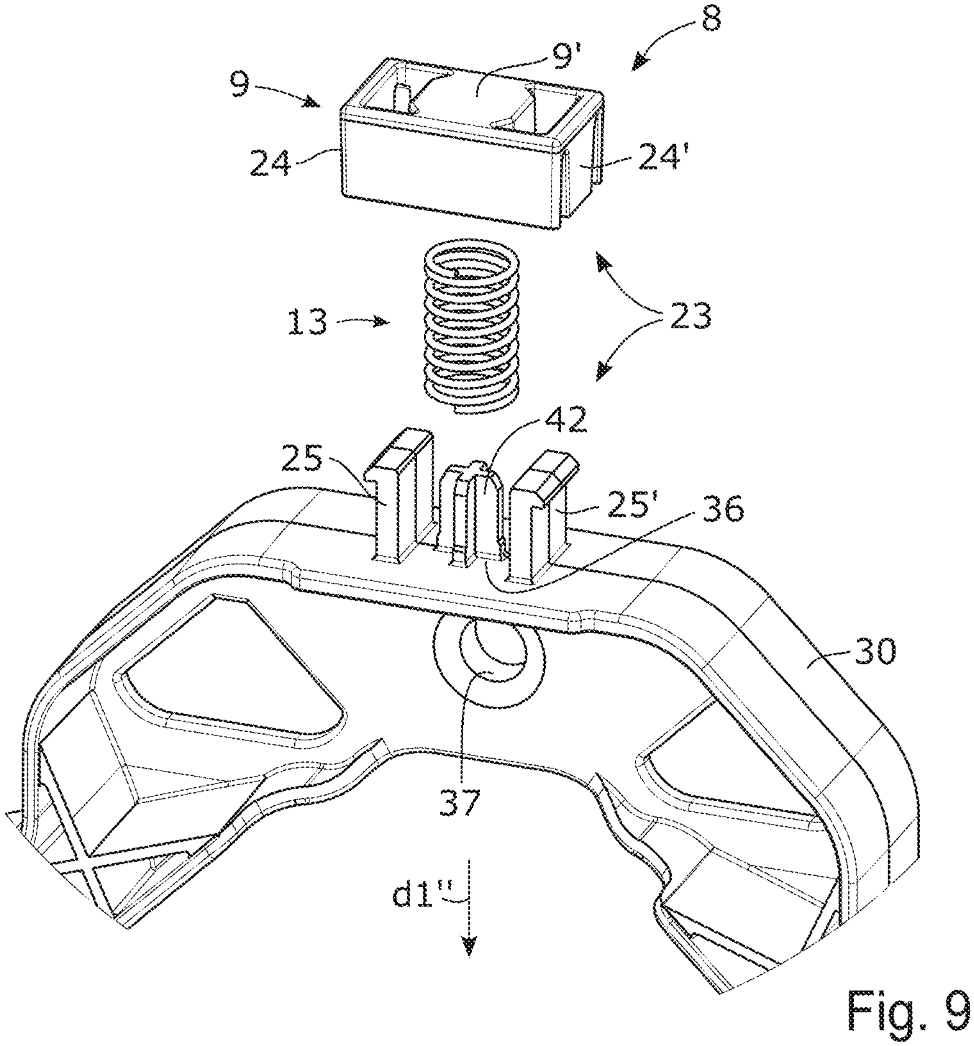
FIG. 9 illustrates an exploded view of a spring assembly and a portion of the trigger element.

FIG. 9 illustrates an exploded view of the spring assembly 8 and a portion of the trigger element 30. As mentioned, according to the illustrated embodiments, the follower 9 is arranged on the trigger element 30 via a snap fit assembly 23.

According to the illustrated embodiments, the snap fit assembly 23 comprises a first pair of snap fit arms 24, 24' arranged on the follower 9 and a second pair of snap fit arms 25, 25' arranged on the trigger element 30. The snap fit arms 24, 24', 25, 25' of the snap fit assembly 23 are also seen and indicated in FIG. 7 and FIG. 8.

Moreover, as is seen in FIG. 7-FIG. 9, the spring member 13 is arranged concentrically around a protrusion 42. The protrusion 42 is arranged on the trigger element 30 between the second pair of snap fit arms 25, 25' arranged on the trigger element 30. Moreover, according to the illustrated embodiments, the spring member 13 is a coil spring. However, according to further embodiments, the spring member 13 as referred to herein, may be another type of spring member, such as another type of compression spring, extension spring, torsion spring, blade spring, elastic element, or the like.

Due to these features, an assembler, or an assembling machine, may assemble the spring assembly 8 in a simple and quick manner simply by placing the spring member 13 onto the protrusion 42 and placing the follower 9 against the trigger element 30 at a position in which the first pair of snap fit arms 24, 24' abuts against the second pair of snap fit arms 25, 25'. Then, the assembler, or the assembling machine, may gently press the follower 9 against the trigger element 30 in the direction d1" indicated above. As a result, the snap fit arms 24, 24', 25, 25' of the snap fit assembly 23 flexes to allow the follower 9 to reach a position relative to the trigger element 30 as illustrated in FIG. 7 in which the follower 9 is locked to the trigger element 30 by edges of the snap fit arms 24, 24', 25, 25'. Accordingly, due to these features, a power tool 1 is provided having conditions for being manufactured and assembled in a simple, quick, and cost-efficient manner.

According to further embodiments, the snap fit assembly 23 may comprise at least one snap fit arm 24, 24' arranged on the follower 9 and/or at least one snap fit arm 25, 25' arranged on the trigger element 30.

As indicated in FIG. 9, the follower 9 comprises an abutment surface 9'. The abutment surface 9' is configured to abut against the sliding surface 18 of the handle 20 indicated in FIG. 7 and FIG. 8. As is seen in FIG. 9, according to the illustrated embodiments, the abutment surface 9' is substantially flat.

As is best seen in FIG. 7 and FIG. 8, according to the illustrated embodiments, the spring member 13 is arranged at least partially inside the follower 9. In this manner, the spring member 13 is at least partially protected from dust and debris. Moreover, a compact spring assembly 8 is provided.

The following is explained with simultaneous reference to FIG. 1-FIG. 9. As mentioned, the switch 10 may be configured to set the power tool 1 in an inactive state when the switch 10 is in the first state, wherein the inactive state constitutes a state in which control of operation of the power source 4 via the actuator 6 is disabled. The switch 10 may be a safety-switch connected to the main trigger 6 such that the main trigger 6 is disabled when the switch 10 is in the first state and such that the main trigger 6 is enabled when the switch 10 is in the second state.

Thus, the switch 10 of the power tool 1 may be configured to set the power tool 1 in either an active or inactive state. By “active state” is meant that a tool 2 attached to the power tool 1 may be set in motion. By “inactive state” is meant that the tool 2 may not be set in motion. Thus, when the power tool 1 is in the “active state”, the power source 4 and the main trigger 6 and other parts relevant for motion of the tool are enabled. When the power tool 1 is in “inactive state” anyone of the power source 4 and the main trigger 6 and other parts relevant for motion of the tool 2 are disabled.

The switch 10 may be set in either of the first state or the second state. The switch 10, and the power tool 1 may be configured such that when the switch 10 is in the first state the power tool 1 is in inactive state and when the switch 10 is in the second state the power tool 1 is in active state. To achieve this, the switch 10 may be connected electrically or mechanically to all or anyone of the power source 4, the main trigger 6 or any other relevant parts of the power tool 1. Such configuration lies within the knowledge of skilled person and may not need to be described further here within.

According to one alternative, the switch 10 may be connected to the power source 4 such that the power source 4 is on when the switch 10 is in the second state and such that the power source 4 is off when the switch 10 is in the first state. According to a second alternative, the switch 10 be connected to the main trigger 6 such that main trigger 6 is enabled when the switch 10 is in the second state and such that the main trigger 6 is disabled (e.g., locked) when the switch 10 is in the first state. These two alternatives may be combined.

Generally, the power tool 1 may be configured such that it starts when the gripping portion 21 of the handle 20 is gripped and the main trigger 6 of the rear handle 5 is pressed.

The switch 10 may be a mechanically actuated micro-switch that closes an electric circuit when it is actuated by a pressing force of the mechanism 7 and that breaks the electric circuit when the pressing force of the mechanism 7 is removed.

Any references to direction or positions such as “above” or “below” or “upper” or “lower” or “upwards” or downwards” as used herein are in relation to a situation in which the handheld power tool is held parallel, such as horizontal, to a ground surface. In such a situation, an intermediate centre portion of the handle may be directed orthogonally, such as vertically, away from the ground surface.

The wording "substantially flat", as used herein, may encompass that the shape of the surface or object referred to deviates less than 10% from the shape of a flat plane.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A handheld power tool comprising:

a tool, a power source configured to power the tool, a handle having an elongated shape and at least one curved portion, a trigger element extending along the at least one curved portion of the handle and being movably arranged relative to the handle, a spring assembly configured to bias the trigger element towards an unactuated position relative to the handle, and a switch configured to switch from a first state to a second state when the trigger element is moved from the unactuated position, and wherein the spring assembly comprises:

a follower, and a spring member configured to bias the follower in a first direction against a sliding surface of one of the handle and the trigger element to bias the trigger element towards the unactuated position, and wherein the follower is slidably arranged relative to the sliding surface along a second direction being perpendicular to the first direction, and wherein the follower is arranged on the other of the handle and the trigger element via a snap fit assembly.

2. The handheld power tool according to claim 1, wherein the spring member is arranged at least partially inside the follower.

3. The power tool according to claim 1, wherein the power tool comprises a guiding arrangement configured to force the trigger element to obtain a movement vector component being parallel to the first direction upon movement of the trigger element from the unactuated position.

4. The power tool according to claim 3, wherein the guiding arrangement comprises a number of guide surfaces arranged on one of the trigger element and the handle and a number of elements arranged on the other of the trigger element and the handle, and wherein the guiding arrangement is configured to force the trigger element to obtain the movement vector component by an abutting contact between at least one element of the number of elements and at least one guide surface of the number of guide surfaces.

5. The power tool according to claim 4, wherein the at least one guide surface is angled relative to each of the first and the second directions.

6. The power tool according to claim 1, wherein the follower is movably arranged on the other of the handle and the trigger element along directions being parallel to the first direction.

7. The power tool according to claim 1, wherein the snap fit assembly comprises at least one snap fit arm.

8. The power tool according to claim 1, wherein the sliding surface is substantially flat.

9. The power tool according to claim 1, wherein the follower comprises an abutment surface configured to abut against the sliding surface, and wherein the abutment surface is substantially flat.

10. The power tool according to claim 1, wherein the power tool comprises one spring assembly-only for biasing the trigger element towards the unactuated position.

11. The power tool according to claim 1, wherein the handle comprises a gripping portion to be gripped by a person, and wherein the trigger element has an activation portion which protrudes from the gripping portion of the handle.

12. The power tool according to claim 11, wherein the gripping portion of the handle is curved to at least partially enclose an area, and wherein the activation portion protrudes from a slot extending on the gripping portion of the handle and faces the area.

13. The power tool according to claim 1, wherein the power tool comprises an actuator for controlling operation of the power source, and wherein the switch is configured to set the power tool in an inactive state when the switch is in the first state, wherein the inactive state constitutes a state in which control of operation of the power source via the actuator is disabled.

14. The power tool according to according to claim 1, wherein the power tool is a hedge-trimmer, a string-trimmer, or a brush-cutter.

15. The power tool according to according to claim 1, wherein the handle is a front handle.

16. A handheld power tool comprising:

a tool, a power source configured to power the tool, a handle having an elongated shape and at least one curved portion, a trigger element extending along the at least one curved portion of the handle and being movably arranged relative to the handle, a spring assembly configured to bias the trigger element towards an unactuated position relative to the handle, and a switch configured to switch from a first state to a second state when the trigger element is moved from the unactuated position, and wherein the spring assembly comprises:

a follower, and a spring member configured to bias the follower in a first direction against a sliding surface of one of the handle and the trigger element to bias the trigger element towards the unactuated position, and wherein the follower is slidably arranged relative to the sliding surface along a second direction being perpendicular to the first direction, and wherein the trigger element is movably arranged relative to the handle from the unactuated position in third and fourth directions being transversal to each of the first and second directions.

* * * * *